(No Model.)

E. THOMSON.
METHOD OF ELECTRIC WELDING.

No. 444,946. Patented Jan. 20, 1891.

WITNESSES

INVENTOR

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 444,946, dated January 20, 1891.

Application filed May 15, 1888. Serial No. 273,988. (No model.)

*To all whom it may concern:*

Be it known that I, ELIHU THOMSON, a citizen of the United States, and a resident of Lynn, in the county of Essex and State of Massachusetts, have invented a certain new and useful Method of Electric Welding, of which the following is a specification.

My invention relates to those methods of welding, brazing, soldering, forging, &c., in which electric currents of large volume or heating effect are employed for the purpose of bringing the work or object to the requisite temperature; and it consists, essentially, in maintaining at the holding-clamps, or rather at the points at which the electric current enters and leaves the work, an approximately or fairly constant difference of electric potential, so as to produce a gradual heating of the work automatically through the gradual increase of resistance of the work due to its increasing temperature. By this method the accumulation of heat is automatically restrained as higher and higher temperatures are reached, the restraint coming as a result of the increased resistance which the work acquires as its temperature increases. The potential difference, though it may be fairly constant, must not be less than is required in order to cause a current to flow over the increasing resistance in amount sufficient to finally cause the accumulation of the requisite amount of heat.

In carrying out my invention any desired apparatus may be employed—such, for instance, as those described in my prior patents, Nos. 347,140, 347,141, and 347,142—the object to be heated being placed in the clamps of the apparatus and the requisite current derived from the sources described in said patents or from any other desired source.

The maintenance of the difference of potential at the work itself may be secured in any of the ways known to electricians and automatically or by manipulations of the apparatus supplying current, as may be desired.

Figure 1:
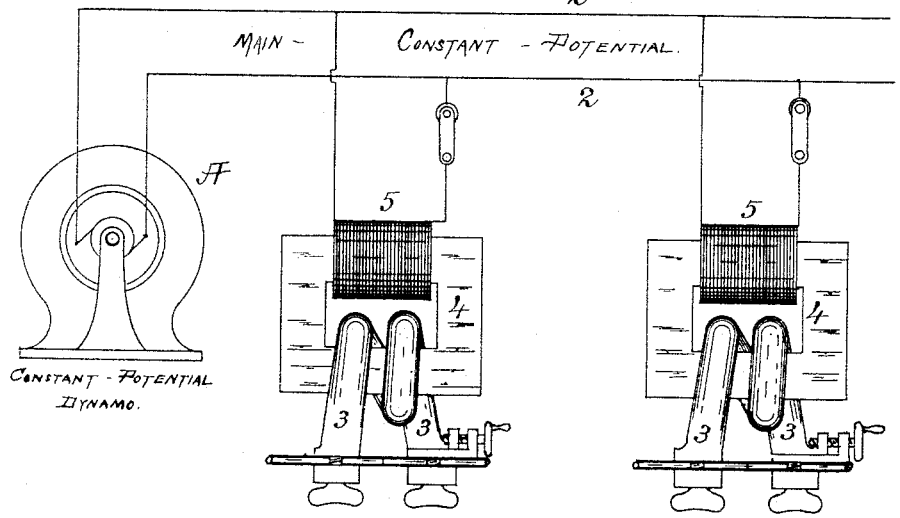
Figure 2:
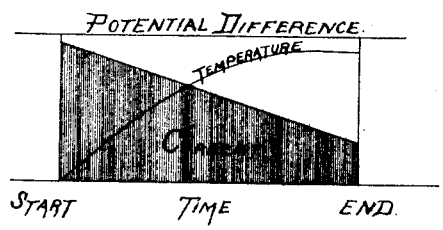

In the accompanying drawings, Figure 1 illustrates diagrammatically an apparatus that may be employed in practicing my invention. Fig. 2 illustrates graphically the conditions of potential difference, current, and temperature.

Referring to Fig. 1, A indicates any dynamo-machine or other source of current adapted to maintain on mains or circuits 2 2 a fairly-constant difference of potential. 3 is the secondary, 4 the iron core, and 5 the primary, of two transformers or induction-coils of the ordinary and well-known construction adapted to change the alternating currents supplied from mains 2 2 through the primaries 5 into currents of large volume and low electro-motive force suitable for heating the work held by the clamps at the terminals of the secondary 3. One of said clamps may be provided for welding operations, as well understood in the art, with suitable means for moving it toward the other while it remains in connection with its own terminal of the secondary.

The apparatus is used in the ordinary way for welding purposes by placing the work in the clamps, bringing the two pieces into contact with pressure and closing the circuit of the primary of the transformer. During heating of the work and the application of pressure for welding the resistance will gradually rise between the terminals of the secondary, the potential difference being, however, practically maintained by the arrangement described, so that there will be produced the relations of potential difference, temperature, and current indicated by Fig. 2, where the heavy-shaded line shows the gradual fall of current as the resistance increases and the unshaded curve shows the gradual increase of temperature produced in the work through the accumulation of heat despite the increase of resistance and fall of current. Here, as before explained, the heating is automatically restrained as higher and higher temperatures are reached by reason of the increased resistance which the work acquires as its temperature increases, while the potential difference remains practically constant.

What I claim as my invention is—

The herein-described improvement in electric welding and other metal-working operations involving the application of a heating electric current to the object to be heated, consisting in maintaining at the work itself a constant or fairly-constant potential difference, so as to permit a gradual heating to be effected automatically by the increments of electric resistance due to increase of temperature.

Signed at Lynn, in the county of Essex and State of Massachusetts, this 11th day of May, A. D. 1888.

ELIHU THOMSON.

Witnesses:
J. W. GIBBONEY,
F. R. HILL.